United States Patent

Gocho

[11] 4,119,861
[45] Oct. 10, 1978

[54] STARTING APPARATUS FOR GAS TURBINE-GENERATOR MOUNTED ON ELECTRIC MOTOR DRIVEN MOTORCAR

[75] Inventor: Choichi Gocho, Tokyo, Japan

[73] Assignee: Tokyo Shibaura Electric Company, Ltd., Japan

[21] Appl. No.: 622,626

[22] Filed: Oct. 15, 1975

[51] Int. Cl.² .................................... B60L 11/06
[52] U.S. Cl. .................................... 290/13; 290/35; 290/51; 320/63; 322/32; 180/65 C
[58] Field of Search .................................... 290/7–17, 290/31–35, 45, 51, 52; 60/39.28 R; 180/65 R, 65 C; 320/63; 322/29, 32

[56] References Cited

U.S. PATENT DOCUMENTS

| 3,171,966 | 3/1965 | Bergslien | 322/32 |
| 3,503,464 | 3/1970 | Yardney | 290/16 |
| 3,591,844 | 7/1971 | Schonebeck | 290/52 |
| 3,605,006 | 9/1971 | Nagae | 322/25 |
| 3,621,370 | 11/1971 | Vandervort | 322/36 |

Primary Examiner—Robert K. Schaefer
Assistant Examiner—William L. Feeney
Attorney, Agent, or Firm—Oblon, Fisher, Spivak, McClelland & Maier

[57] ABSTRACT

A starting apparatus for a gas turbine-generator mounted on an electric motor driven motorcar includes a gas turbine and an A.C. generator with A.C. output terminals coupled directly to the turbine. A rectifier with D.C. output terminals is connected to the A.C. output terminals of the A.C. generator. A battery device is connected to the D.C. output terminals of the rectifier. An inverter has D.C. input terminals connected to the floating battery device in parallel and A.C. output terminals from which an A.C. output is derived. A control circuit is connected to the inverter for controlling the speed of the motorcar. At least one A.C. motor energized by the A.C. output of the inverter for driving the motorcar is provided. A switching device connects the A.C. output terminals of the inverter to the A.C. output terminals of the A.C. generator when the gas turbine is started and connects the A.C. output terminals to the A.C. input terminals of the A.C. motor after the gas turbine is started. A fire detecting device is connected to the switching device for detecting the self ignition of the gas turbine.

8 Claims, 4 Drawing Figures

STARTING APPARATUS FOR GAS TURBINE-GENERATOR MOUNTED ON ELECTRIC MOTOR DRIVEN MOTORCAR

BACKGROUND OF THE INVENTION

1. Field of the Invention

This invention relates to an electric motor driven motorcar, and, more particularly, to an improved starting apparatus for a gas turbine-generator mounted on the electric motor driven motorcar.

2. Description of the Prior Art

Several attempts have been made to render clean the waste gas from a motorcar. One of these attempts has been to use a battery device for energization of an electric motorcar. However, as is well known in the battery motorcar art, it has been difficult to achieve long distance driving without battery exchange. The battery car also has the defect that the battery life is shortened when a variable load current is repeatedly drained from the battery because a variable torque loads the electric motor during the running of the car.

There has recently been developed and put to practical use an electric motor driven car having a hybrid driving system which consists of a floating battery device and an engine-generator for charging the battery by the output of the car. In accordance with this hybrid driving system, it is possible to run the internal combustion engine with a relatively constant rotational speed in spite of the load variation on the electric driving motor so that the waste gas from the engine involves few substances which pollute the air.

For this purpose, a Diesel engine has preferably been employed for driving the A.C. motor. However, as is well known, the Diesel engine has the significant defect that is quite heavy in weight/HP so as not to be suited for use with an electric motor driven motorcar.

From the above point of view, a small size gas turbine which has a rated output of 50 to 100 PS and which is capable of running with a high rated rotational speed of several million r.p.m. has been developed for driving the generator by the gas turbine mounted on the electric motor driven motorcar.

However, with a high speed gas turbine, the specific problem has been found that the gas turbine must raise its rotational speed from zero to at least 30% of the rated speed to enable self ignition upon the starting of the gas turbine. However, if the compressed air compressed by the rotary compressor of the gas turbine and supplied to the combustion chamber thereof is not at a predetermined pressure due to a low running speed of the gas turbine, the mixed gas will not be at a temperature capable of self ignition in the combustion chamber.

It has further been found that cell motors which are available in the general market at present are not capable of driving the gas turbine at a high speed of 60,000 of 80,000 r.p.m. without the help of specifically designed transmission gear. However, such transmission gear with over-drive is too expensive and complicated to manufacture to be practical.

SUMMARY OF THE INVENTION

It is accordingly, an object of the invention to provide a new and improved unique starting apparatus for a gas turbine-generated mounted on an electric motor driven motorcar.

Another object of the invention is to provide an apparatus capable of easily starting a high speed gas turbine-generator without the help of a cell motor and a transmission with over-drive gear.

A still further object of the invention is to provide a starting apparatus for a high speed gas turbine-generator for use with an electric motor driven motorcar in which an alternator connected directly to a gas turbine operates as a starting motor for the turbine by being energized from a floating battery device through an inverter during starting of the gas turbine, so that both cell motor and over drive transmission can preferably be eliminated to enable the starting apparatus for the gas turbine-generator to be manufactured both inexpensively and with a small size.

The foregoing and other objects are attained in accordance with one aspect of the present invention, through the provision of a starting apparatus for a gas turbine-generator mounted on electric motor driven motorcar comprising a gas turbine, an A.C. generator coupled directly to the engine to be driven therefrom, a rectifier for rectifying an A.C. output from the A.C. generator, a floating battery device having a pair of terminals connected to the D.C. output terminals of the rectifier to be charged therefrom, an inverter having D.C. input terminals connected to the battery terminals and A.C. output terminals from which an A.C. output is derived, at least one A.C. motor for driving the car wheels through energization from the A.C. output terminals of the inverter, and switching means provided among the A.C. output terminals of the inverter, the output terminals of the A.C. generator and the input terminals of the A.C. motor, whereby, when the gas turbine is started, the switching means connects the A.C. output terminals of the inverter to the A.C. generator terminals to run the generator as an asynchronous starting motor for the gas turbine, and, after the gas turbine is started, the switching means enables the same terminals of the inverter to be connected to the A.C. motor terminals.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

Figure 1:
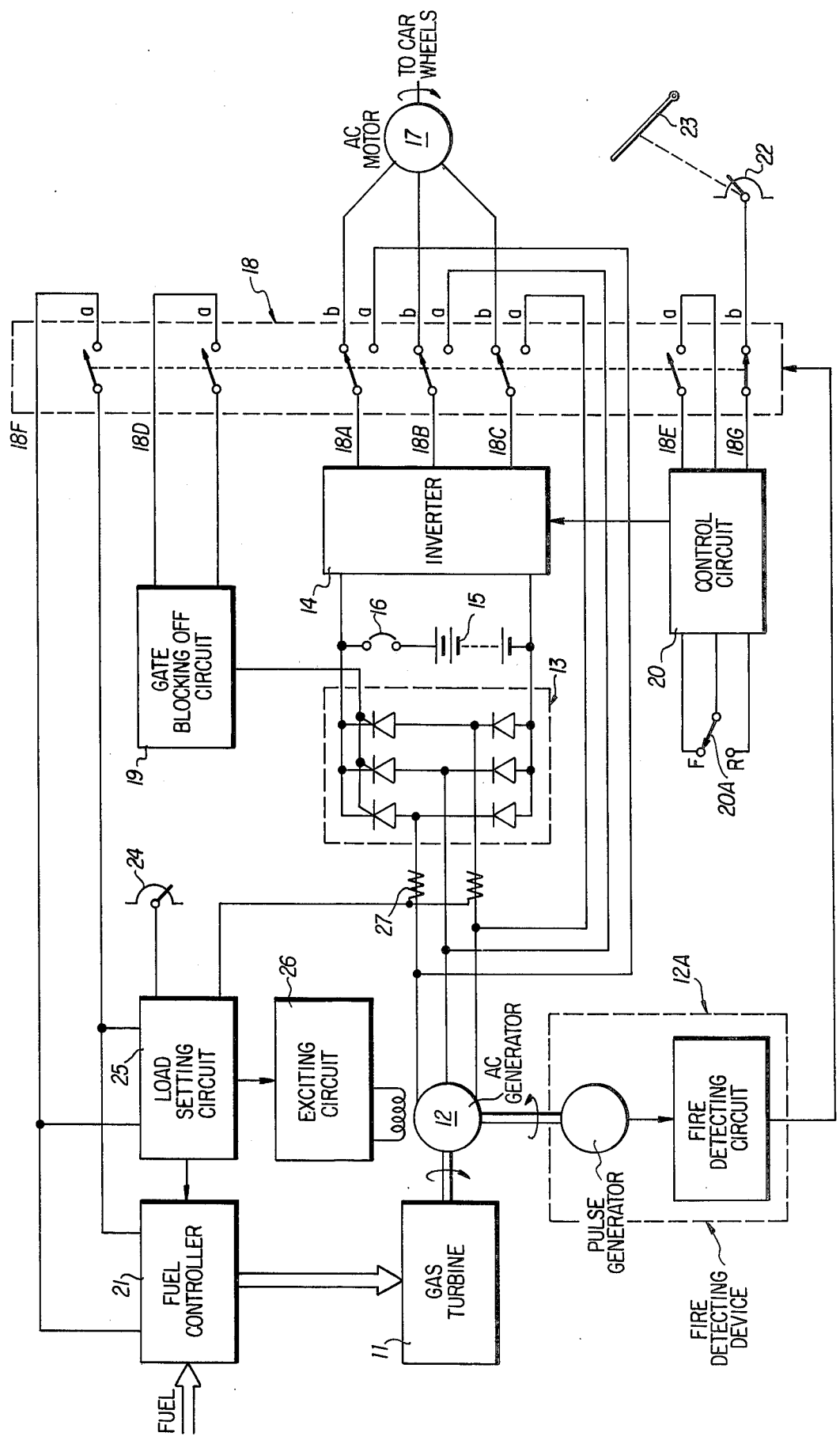
FIG. 1 is a circuit diagram of one embodiment of a starting apparatus for a gas turbine-generator mounted on an electric motor driven motorcar according to the invention.

Referring now to the drawings, wherein like reference numerals designate identical or corresponding parts throughout the several views and more particularly to FIG. 1 thereof, there is shown one preferred embodiment of a starting apparatus for a gas turgine-generator mounted on an electric motor driven motorcar according to the invention.

A gas turbine 11 is provided and is able to produce its rated output of 50 to 100 PS under a rotational speed of 65,000 or 80,000 r.p.m., for example. The gas turbine 11 is mechanically and directly connected with an A.C. generator 12 preferably through a spline coupling device (not shown). Since the gas turbine speed is too high as described above, it is preferable to use a brushless A.C. generator 12 to be driven by the turbine 11. For this purpose the A.C. brushless generator 12 may preferably be composed of a three-phase stationary stator winding and a conventional claw clutch rotor having comb-shaped magnetic poles.

The D.C. excitation may preferably be applied from D.C. excitation windings positioned at a stationary framework with respect to the comb-shaped magnetic poles on the rotor. One example of this form of excitation is disclosed in U.S. Pat. No. 3,648,087 granted to H. Kitamura and assigned to the same assignee of this invention. With this arrangement, the A.C. generator has no friction parts of electrical current flow therethrough enabling it to be designed with respect to to journal thereof so that an air suspension bearing system may be applied thereto.

The A.C. output terminals of the A.C. generator 12 are connected with A.C. input terminals of a mixed type rectifier 13, namely, a three-phase full wave bridge connected rectifier in which mixed connections of diodes and thyristors are used for economical purposes. The D.C. output terminals of the mixed type rectifier 13 are connected with the A.C. input terminals of an inverter 14 and are also connected with a battery device 15 for charging, in a floating manner, through a protection circuit breaker 16. Thus, inverter 14 converts the D.C. voltage to a three-phase A.C. voltage.

Three-phase output terminals of inverter 14 are further connected with the input terminals of an A.C. motor or induction motor 17 through contacts 18A, 18B and 18C of a switching device 18, respectively.

During normal running of the car, the contacts 18A, 18B and 18C of switching device 18 assume position "b" so as to connect the output terminals of the inverter 14 with the terminals of the A.C. motor 17 for driving the wheels of the car. The switching device 18 further includes contacts 18D, 18E and 18F which assume position "a" to close these contacts when starting the gas turbine 11 and contact 18G which assumes position "b" to close its contact when running the car.

When starting the gas turbine 11, each of contacts 18A, 18B and 18C assumes alternate position "a" to supply the A.C. voltage from the inverter 14 to the A.C. generator 12 to drive it as a motor.

For running the A.C. generator 12 as a motor, a conventional damper winding is provided around the rotor periphery so that the A.C. generator 12 can be run as an induction motor when energized from inverter 14. Of course, when the generator runs as a motor, the D.C. excitation is cut off.

At the same time, since the contact 18D of the switching device 18 is closed, a gate blocking off circuit 19 acts on the thyristors of the mixed type rectifier to turn them off to cut off the connection between the terminals of the A.C. generator 12 and the battery device 15. A control circuit 20 produces signals for controlling the inverter device 14 closing the contact 18E of the switching device 18 and has a F-R switching device 20A for changing the forward and reverse movement of the car.

Fuel from a fuel controller 21, which is provided to control a quantity of fuel, such as heavy oil, is supplied to the gas turbine in accordance with the operation closed contact 18F of the switching device 18.

During the running of the car, the switching device 18 is changed from the "a" position to the "b" position by means of fire detecting device 12A. Fire detecting device 12A is provided with a pulse generator coupled directly to the shaft of the turbine-generator and a fire detecting circuit and detects when the gas turbine ignites itself such as when the speed of the turbine-generator reaches at least 30% or more of the rated speed of the gas turbine. Such fire detecting circuits are well known and one such device is disclosed in British Patent No. 1,229,977.

By changing the switching device 18 as described above, when the mixed type rectifier 13 assumes a conductive state, a running series circuit, namely gas turbine 11-A.C. generator 12-rectifier 13- battery device 15- inverter device 14- switching device 18- and A.C. motor 17 is formed.

When the control circuit 20 is controlled by a car speed setter 22 such as a potentiometer in response to a footpedal 23 through the contact 18G of the switching device 18, the output of inverter device 14 is varied by the position of the footpedal 23. Thus, the running speed of the car is controlled in response to the position of the footpedal 23.

The gas turbine 11 is controlled by a speed setter 24 of the gas turbine 11 through a load setting circuit 25 and the fuel controller 21 to rotate at a constant speed. A D.C. current for exciting the field winding of the A.C. generator 12 is supplied by exciting circuit 26 in accordance with the output of the setting circuit 25. The setting circuit 25 has a feedback signal terminal connected with a current transformer 27 for detecting the output current of A.C. generator 12.

The following is an explanation of the operation for starting the gas turbine. By changing the switching device 18 from position "b" to position "a," the A.C. generator 12, as an induction motor, is driven by the battery device 15 through inverter device 14 in accordance with the predetermined output of the control circuit 20.

Thus, the gas turbine 11, coupled mechanically with a shaft of the A.C. generator 12, is directly driven at a high speed without interruption until it is self ignited. Thus the gas turbine 11 rotates at a speed in accordance with the output of the control circuit 20.

After the gas turbine 11 is self ignited, the switching device 18 is changed by means of the fire detecting device. Thus, the car shifts from its starting state to its running state.

The A.C. output of the A.C. generator 12 driven by the gas turbine 11 is converted by the mixed type rectifier 13 from the three-phase A.C. voltage to the D.C. voltage and the output of the rectifier 13 is supplied to the battery device 15 through the circuit breaker 16 and to the D.C. input terminals of the inverter device 14, respectively. Therefore, at a low speed running of the car, the battery device 15 receives the D.C. voltage for charging from the mixed type rectifier 13 and at a high speed running of the car, it supplies the D.C. voltage to the inverter device 14.

The A.C. motor 17 coupled to the car wheels is driven by the inverter device 14. Thus, the speed of the car can be controlled by means of the footpedal 23 in response to movement of the operator's foot. Forward and reverse running of the car is controlled by the F-R switching device 20A. Since the gas turbine rotates at a constant speed set by the setter 24, the efficiency of the gas turbine is maintained at a higher rate when the car is running.

Reference will now be made to the inverter device 14 and control circuit 20 shown in FIG. 2 and to the fuel controller 21, the load setting circuit 25 and the exciting circuit 26 shown in FIG. 3.

Figure 2:
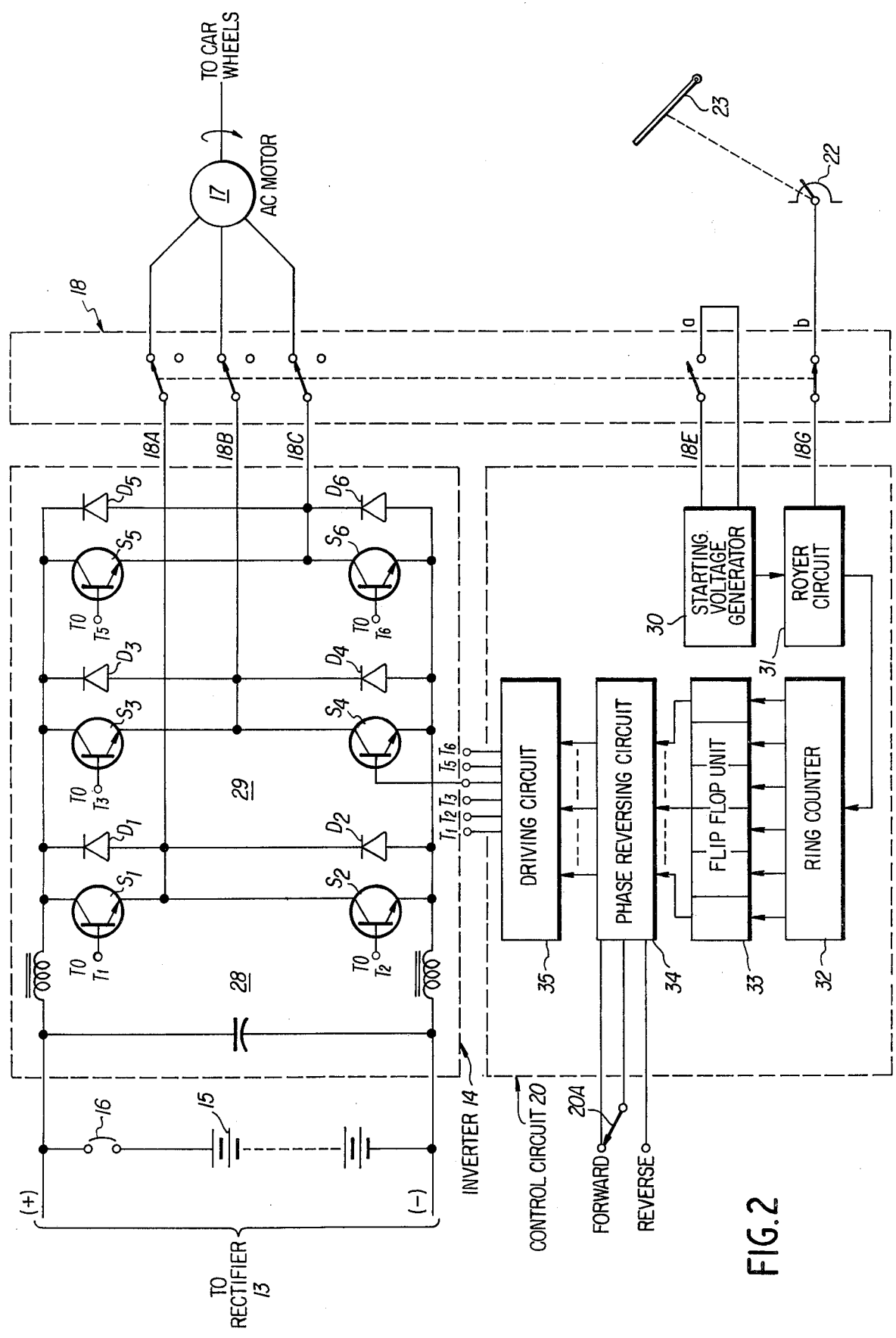
FIG. 2 shows a transistor inverter with a base driving circuit for use with the apparatus shown in FIG. 1.

Referring to FIG. 2, the inverter device 14 consists of a LC filter 28 and a three-phase bridge type inverter 29 having a plurality of switching elements S1–S6, such as a power transistor, a thyristor or a gate turn-off type thyristor, and a plurality of flywheel diodes D1–D6 reversely connected to the switching element, respectively. The control circuit 20 comprises a starting voltage generator 30, a Royer circuit 31 (invented by G. H. Royer and described in Trans. A.I.E.E., 74 p. 322, 1955) for converting the deviation of the D.C. input signal to the deviation of frequency, a ring counter 32, a flip-flop unit 33, a phase reversing circuit 34 for changing forward and reverse running of the car by means of the F-R switching device 20A, and a driving circuit 35 which amplifies each signal of the phase reversing circuit 34 and supplies each amplified signal to respective gates of the inverter 29. The output of starting voltage generator 30 increases at a predetermined rate when the contact 18E of the switching device 18 is closed. The A.C. output of the Royer circuit 31 is supplied to the ring counter 32 which is designed to produce six pulses. These pulses are supplied to the terminals of the flip-flop unit 33 respectively.

Therefore, at the start of the gas turbine 11, the starting voltage generator 30 of the control circuit 20 generates the above mentioned output. However, during the running of the car, the output of the control circuit 20 is varied in response to the position of the footpedal 23.

Figure 3:
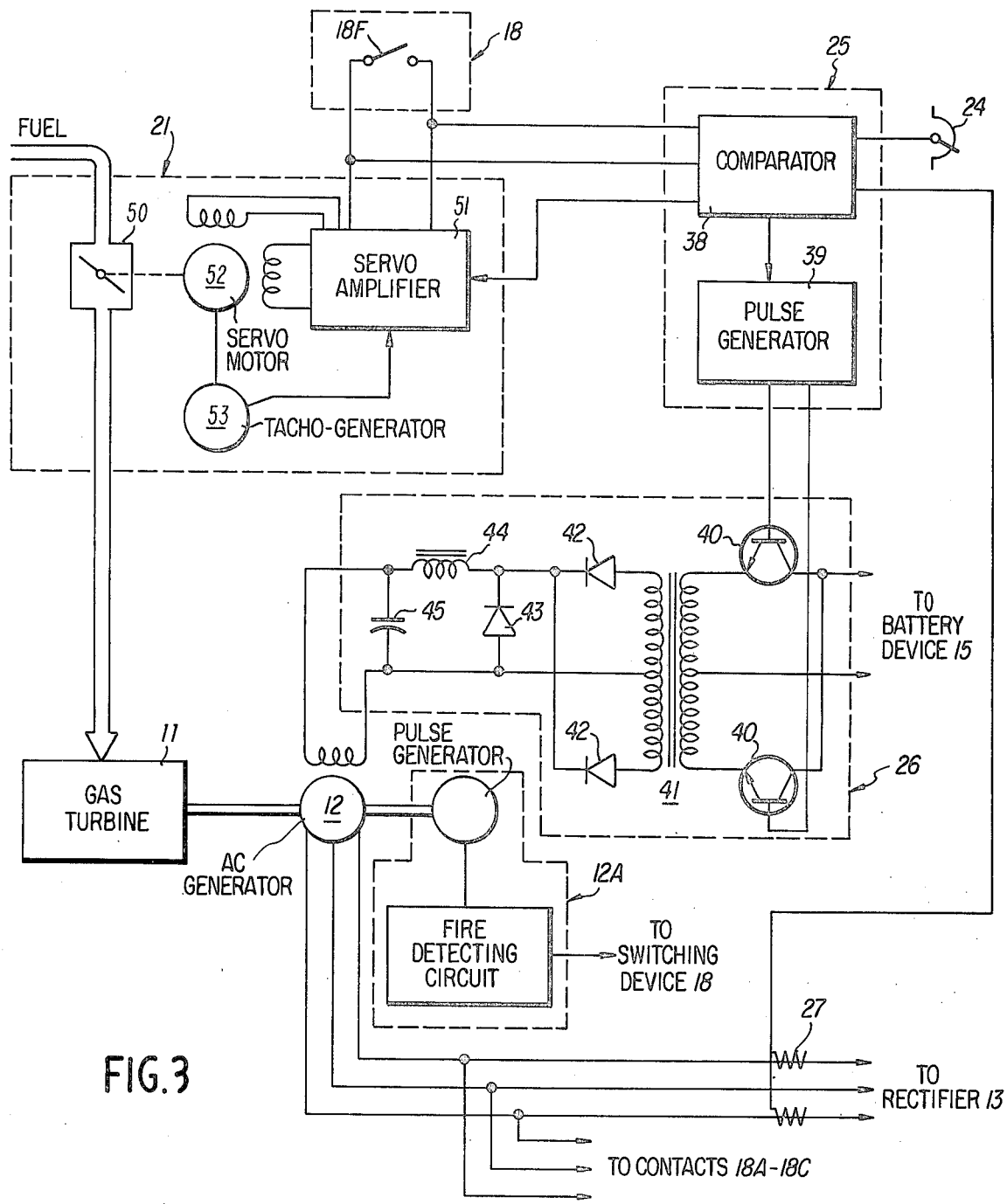
FIG. 3 is a circuit for effecting fuel supply control for the gas turbine as well as for applying the D.C. excitation to the A.C. generator shown in FIG. 1.

Referring to FIG. 3 which illustrates the control apparatus for the gas turbine 11 and the A.C. generator, the fuel controller 21 comprises a butterfly valve 50 for controlling the quantity of the fuel in response to the output of a servo amplifier 51. The servo amplifier 51 includes a servo motor 52 for controlling the butterfly valve 50 and a tacho-generator 53 to obtain a feedback signal. Although the servo amplifier 51 acts in response to the output of the setting circuit 25, the servo amplifier 51 maintains a certain constant output when the gas turbine 11 starts, i.e. the contact 18F of the switching device 18 is closed.

The setting circuit 25 consists of a comparator 38 which compares the value of the setter 24 with those detected by the current transformer, and a pulse generator 39 which generates pulses in proportion to the output of the comparator 38.

The exciting circuit 26 comprises a transistorized chopper 40 for chopping the D.C. voltage supplied from the floating battery device 15, a transformer 41 for raising the D.C. chopped voltage, a rectifier element 42, a smoothing filter having a flywheel diode 43, a reactor 44 and a capacitor 45.

The field winding of the A.C. generator 12 is energized from the exciting circuit to maintain the output voltage of the A.C. generator 12 constant. When the gas turbine 11 starts, the comparator 38 is designed so as not to generate an output in order to interrupt the excitation of the A.C. generator 12.

Figure 4:
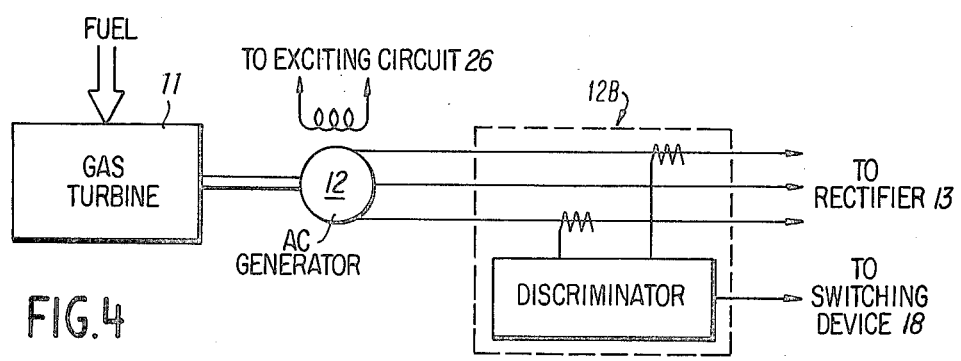
FIG. 4 shows another fire detecting device according to the invention.

Referring to FIG. 4, there is shown an alternate embodiment of the fire detecting device 12B which comprises a discriminating device which converts the deviation of frequency of the A.C. output of the A.C. generator to a D.C. voltage output operates when the gas turbine 11 self ignites, i.e. when the frequency $f$ of the A.C. output of the A.C. generator reaches a predetermined value because the frequency $f$ of the A.C. output of the A.C. generator 12 is proportional to the speed $n$ of the turbine-generator. This is understood from the following equation.

$$n = 120 f / P$$

where $P$ represents the number of poles.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A starting apparatus for a gas turbine-generator mounted on an electric motor driven motorcar comprising:

a gas turbine,
   an A.C. generator with A.C. output terminals, the A.C. generator coupled directly to the turbine,
   a rectifier with D.C. output terminals, the rectifier connected to the A.C. output terminals of the A.C. generator,
   a battery device connected in a floating manner to the D.C. output terminals of the rectifier,
   an inverter having D.C. input terminals connected to the floating battery device in parallel and A.C. output terminals from which an A.C. output is derived,
   a control circuit connected to the inverter for controlling the speed of the motorcar,
   at least one A.C. motor energized by the A.C. output of the inverter for driving the motorcar,
   a switching device connecting he A.C. output terminals of the inverter to the A.C. output terminals of the A.C. generator when the gas turbine starts and connecting the A.C. output terminals of the inverter to the A.C. input terminals of the A.C. motor after the gas turbine is started,
   a fire detecting device connected to the switching device for detecting the self ignition of the gas turbine,
   a fuel controller connected to the gas turbine for controlling the quantity of fuel supplied to the gas turbine,
   an exciting circuit connected to the A.C. generator for exciting the A.C. generator,
   a setter for setting the speed of the gas turbine,
   a current transformer connected to the output of the A.C. generator,
   a load setting circuit disposed between the fuel controller and the exciting circuit for receiving the output of the setter and the deviation output of the current transformer and for transmitting same to the fuel controller and the exciting circuit, and
   a switching means operatively connected to the switching device for controlling the fuel controller and the load setting circuit.

2. A starting apparatus according to claim 1 wherein the fuel controller comprises:

a valve coupled to the gas turbine,
   a servo motor coupled to the valve, and
   a servo amplifier connected to the servo motor.

3. A starting apparatus according to claim 1 wherein the load setting circuit comprises a comparator having two input terminals connected to the setter and the current transformer and a pulse generator connected to the comparator.

4. A starting apparatus according to claim 1 wherein the exciting circuit comprises:
- a transistorized chopper connected to the floating battery device for chopping the D.C. voltage of the floating battery device in response to the output pulse of the pulse generator of the load setting circuit,
- a transformer connected to the transistorized chopper,
- a rectifier element connected to the transformer, and
- a smoothing filter disposed between the rectifier element and the A.C. generator.

5. A starting apparatus for a gas turbine-generator mounted on an electric motor driven motorcar comprising:
- a gas turbine,
- an A.C. generator with A.C. output terminals, the A.C. generator coupled directly to the turbine,
- a rectifier with D.C. output terminals, the rectifier connected to the A.C. output terminals of the A.C. generator,
- a battery device connected in a floating manner to the D.C. output terminals of the rectifier,
- an inverter having D.C. input terminals connected to the floating battery device in parallel and A.C. output terminals from which an A.C. output is derived,
- a control circuit connected to the inverter for controlling the speed of the motorcar,
- at least one A.C. motor energized by the A.C. output of the inverter for driving the motorcar,
- a switching device connecting the A.C. output terminals of the inverter to the A.C. output terminals of the A.C. generator when the gas turbine starts and connecting the A.C. output terminals of the inverter to the A.C. input terminals of the A.C. motor after the gas turbine is started, and
- a fire detecting device connected to the switching device for detecting the self ignition of the gas turbine;

wherein said control circuit comprises
- a driving circuit connected to the inverter,
- a phase reversing circuit connected to the driving circuit,
- a flip-flop unit connected to the phase reversing circuit,
- a ring counter connected to the flip-flop unit,
- a Royer circuit connected to the ring counter, and
- a starting voltage generator connected to the Royer circuit.

6. A starting apparatus according to claim 5 including a switching equipment connected to the phase reversing circuit for switching between forward and reverse running of the motorcar.

7. A starting apparatus according to claim 5 wherein the starting voltage generator increases at a predetermined rate when a switching means operatively connected to the switching device is closed.

8. A starting apparatus according to claim 5 including a footpedal, a car speed setter controlled by the position of the footpedal, and a switching means operatively connected to the switching device for connecting the car speed setter to the Royer circuit.

* * * * *